United States Patent [19]

Boers

[11] Patent Number: 4,786,004
[45] Date of Patent: Nov. 22, 1988

[54] ARMATURE WINDING MACHINE WITH REMOVABLE SHROUDS

[75] Inventor: Arie Boers, Plymouth, Minn.
[73] Assignee: Micafil, Inc., Englewood, Ohio
[21] Appl. No.: 20,438
[22] Filed: Apr. 24, 1987

Related U.S. Application Data

[62] Division of Ser. No. 782,431, Oct. 1, 1985, Pat. No. 4,708,297.

[51] Int. Cl.⁴ ............................................. H02K 15/09
[52] U.S. Cl. .................................................. 242/705 B
[58] Field of Search ..................... 242/7.05 R, 7.05 A, 242/7.05 B

[56] References Cited

U.S. PATENT DOCUMENTS

| | | | |
|---|---|---|---|
| 2,348,948 | 5/1944 | Allen | 242/7.05 R |
| 2,939,641 | 6/1960 | Setley | 242/7.05 R |
| 2,969,195 | 1/1961 | Leithe | 242/1.1 |
| 3,345,002 | 10/1967 | Peters | 242/7.05 R |
| 3,636,621 | 1/1972 | Dammar | 242/7.05 B |
| 3,713,598 | 1/1973 | Buckoltz | 242/7.05 B |
| 3,785,583 | 1/1974 | Biddison | 242/7.05 B |
| 3,927,466 | 12/1975 | Dammar | 242/7.05 B |
| 3,927,843 | 12/1975 | Dammar | 242/7.05 B |
| 4,174,815 | 11/1979 | Dammar | 242/7.05 B |
| 4,262,853 | 4/1981 | Dammar | 242/7.05 B |
| 4,520,965 | 6/1985 | Kimura | 242/7.05 B |

FOREIGN PATENT DOCUMENTS 1437481 3/1966 France .

Primary Examiner—Stuart S. Levy
Assistant Examiner—Katherine Matecki
Attorney, Agent, or Firm—Burd, Bartz & Gutenkauf

[57] ABSTRACT

An armature winding machine has an armature winding core holder provided with a collet assembly for gripping the shaft of an armature core. The collet assembly has a plurality of releasable balls that connect the collet assembly to a support. A tool having a push rod and hooked fingers is used to release the balls and grasp the collet assembly for removal from its support. Another collet assembly can be mounted on the support with the tool. The armature winding machine has chucks with wire form or shrouds for guiding wire into selected slots in the armature core during the winding of the wire with the rotating flyers of the machine. The chucks are releasably mounted on supports so that they can be removed as a unit from the support and replaced with different sized chucks. The chuck and supports have cooperating connecting structure and locking dogs that releasably hold the chucks on the supports.

22 Claims, 4 Drawing Sheets

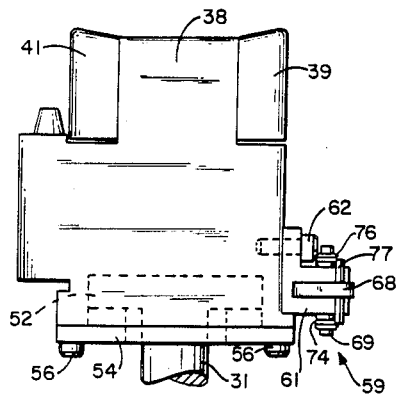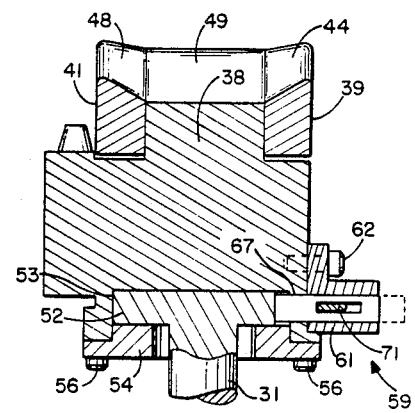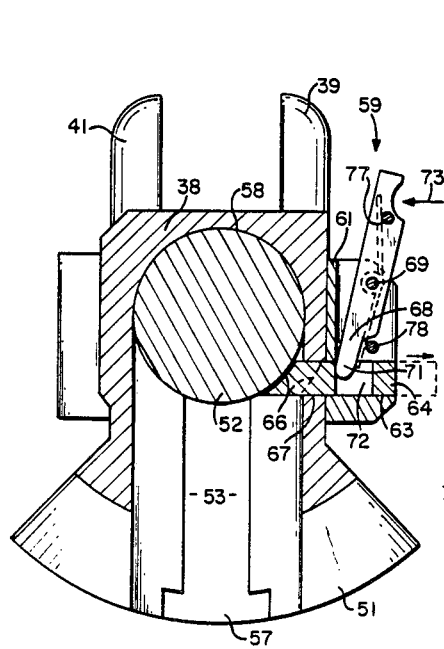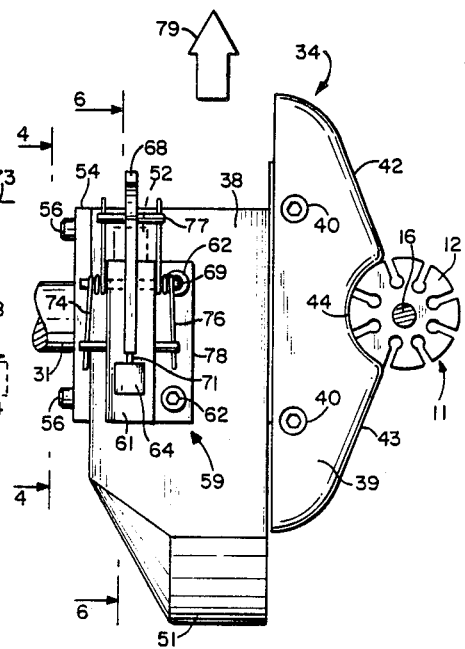

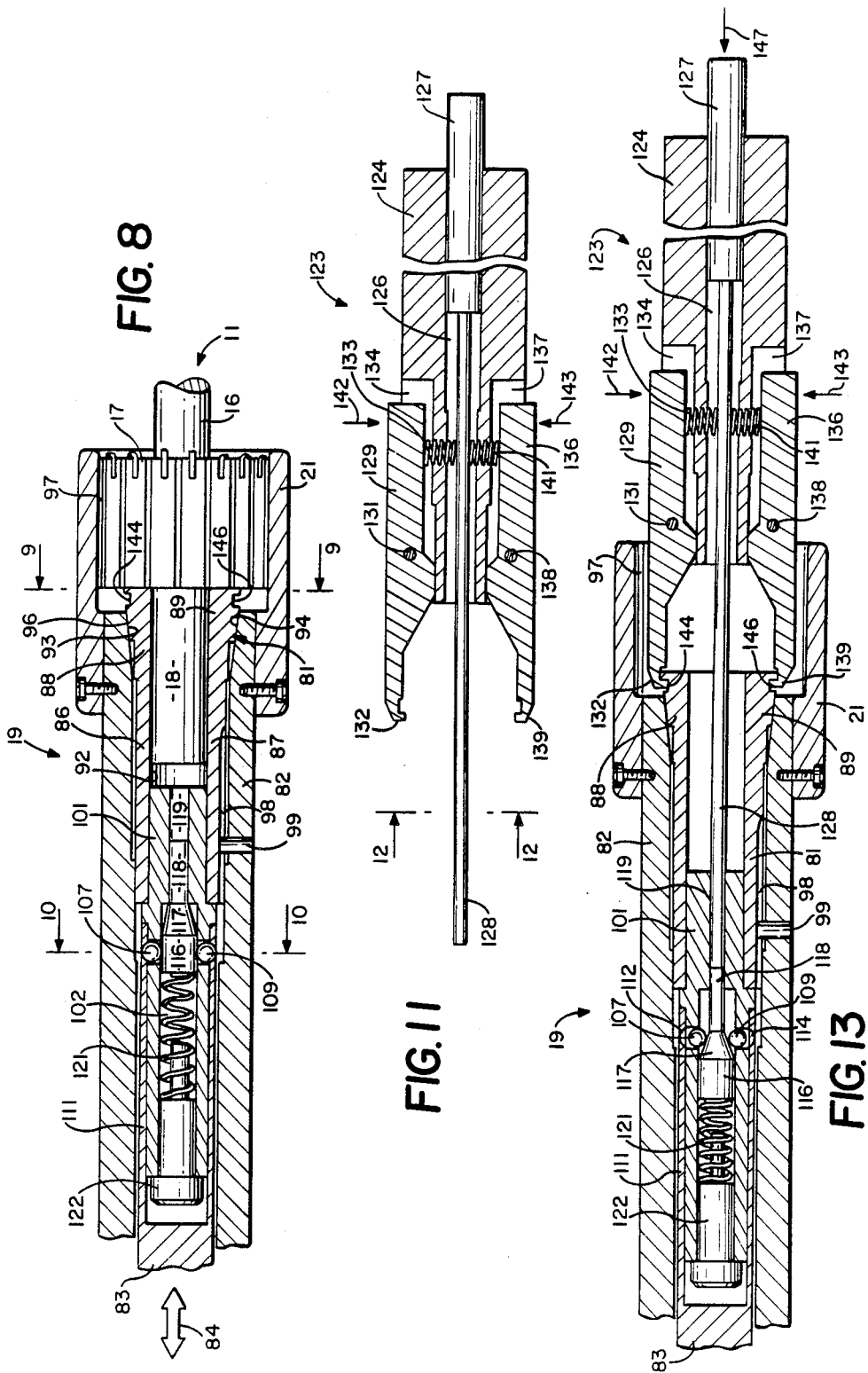

ARMATURE WINDING MACHINE WITH REMOVABLE SHROUDS

This application is a division of U.S. application Ser. No. 782,431 filed Oct. 1, 1985, now U.S. Pat. No. 4,708,297.

FIELD OF INVENTION

The invention is in the field of armature winding machines having holders for supporting armature cores and shrouds for guiding wires moving from rotating flyers into selected slots in the armature core.

BACKGROUND OF INVENTION

Armature winding machines have flyers that are rotated to wind coils of wire onto a slotted armature core. These machines have holders that locate the cores between the flyers and index the cores during the winding operation. Drive mechanisms operate to rotate the flyers in opposite directions to simultaneously place two coils of wire into selected slots in the armature cores and start and stop the rotation of the flyers to allow indexing of the cores. An example of this type of armature winding machine is disclosed by Dammar in U.S. Pats. Nos. 3,636,621 and 3,927,843. The holders have collet assemblies that grip the ends of the shafts of the armature cores during the winding operation. The collet assemblies are an integral part of the holders and are not readily removed from the machine. Each assembly has collet members that surround a pocket for accommodating the end of the armature core shaft. There is no structure to alter the size of the pocket so that only one size of shaft can be retained in the collet assembly. The entire holder must be replaced on the machine to accommodate an armature core having a different size shaft. A substantial amount of time and labor is required to remove a holder and replace it with another holder in the conventional armature winding machine.

Armature winding machines have shrouds or wire forms located adjacent the opposite sides of the armature core. The shrouds or wire forms have outer surfaces that guide the wire leaving rotating flyers into selected pairs of slots in the armature core. The central portions of the shrouds have longitudinal recesses for accommodating side portions of the armature core. The side recesses have arcuate configurations that follow the curvature of the armature core. When different sized armature cores are to be wound, different shaped shrouds must be mounted on the supports of the machine. This is a laborious and time consuming task because the shrouds are mounted on the supports in a permanent manner such that they are not readily moved from the supports. These armature winding machines cannot be quickly changed to accommodate different sized and shaped armature cores. The shrouds are mounted on supports in a manner that they are not readily removable from the supports.

SUMMARY OF INVENTION

The invention is directed to an armature winding machine of the type having means for winding coils of wire into a slotted armature core. The armature core is located with a core holding means in a position to receive coils of wire from the means for winding the wire. The core holding means includes a collet assembly operable to selectively hold the armature core and release the armature core. The collet assembly has means for releasably connecting the collet assembly to a support whereby the collet assembly can be removed as a unit from its support and replaced with another collet assembly. This enables the operator of the machine to quickly set up the machine to quickly set up the machine for different sized and types of armature cores. The machine includes shroud wire form means for guiding wire into selected slots in the armature core. The shroud means are releasably mounted on support means in a manner so that they can be readily removed as a unit and replaced with different sized and shaped shroud means. The removable collet assembly and the replaceable shroud means enable the operator of the machine to quickly set up the machine with a minimum of time and labor to accommodate different sized armature cores.

According to a preferred embodiment of the armature winding machine, a collet assembly is releasably attached to a sleeve having a plurality of recesses accommodating movable locking members, such as balls. The collet assembly has a tubular body provided with a plurality of radial holes for the movable members. A locking member is located within the tubular body and engageable with the movable members to hold the movable members in the recesses in the sleeve. The locking member has a cylindrical portion engageable with the movable members to retain them in the recesses and a converging cone portion that allows the movable members to move out of the recesses to thereby release the collet assembly from the sleeve. The collet assembly can then be removed as a unit from the sleeve and replaced with another collet assembly. The tubular body of the collet assembly has a bore open to the pocket of the collet assembly. The locking member has a rod extended into the bore which is adapted to be engaged by a push rod operable to move the locking member to locate the cone portion adjacent the movable members to allow the movable members to move out of the recesses. The push rod is part of a tool that is used to remove the collet assembly from its support. The tool has a body of carrying a plurality of movable fingers. The fingers have hooked ends adapted to grip the collet assembly so that it can be extracted from its support.

The invention includes shroud means for guiding the wires onto selected slots of the armature cores that are releasably mounted on support means for the machines. The shroud means and support means have cooperating means that allow the shroud means to be removed as a unit from the support means. Releasable lock means associated with the cooperating means are used to retain the shroud means on the supports. When the lock means are moved to their release positions, the shroud means can be separated from the support. Another shroud means having a size and shape to accommodate these selected armature core can then be placed on the support means.

DESCRIPTION OF DRAWING

FIG. 3 is an enlarged sectional view taken along the line 3—3 of FIG. 1;

FIG. 5 is a top view of the shroud assembly of FIG. 3;

FIG. 6 is a sectional view taken along the line 6—6 of FIG. 3;

FIG. 7 is a sectional view taken along the line 7—7 of FIG. 4;

FIG. 8 is enlarged sectional view taken along the line 8—8 of FIG. 1;

FIG. 11 is a side view, partly sectional, of the tool to release and remove the collet assembly from the holder;

FIG. 13 is a sectional view of the collet assembly located within the holder and the tool releasing the collet assembly for removal of the collet assembly from the holder.

DETAIL DESCRIPTION OF INVENTION

Figure 1:
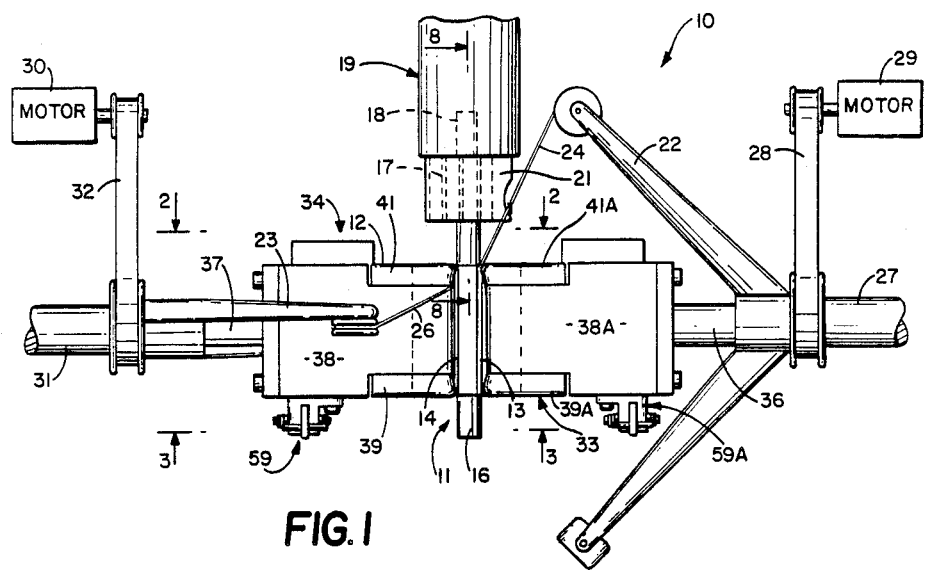
FIG. 1 is a plan view of the wire winding and armature core holding assembly of an armature winding machine.

Referring to FIG. 1 of the drawing, an armature winding assembly indicated generally at 10 of an armature winding machine is operable to wind coils of wire on a slotted armature core indiated generally at 11. Armature core 11 has a cylindrical body 12 having a plurality of circumferentially spaced longitudinal slots 13 and 14 for accommodating coils or wire. Body 12 is mounted on a longitudinal shaft 16. A commutator 17 is mounted on one end of shaft 16. Shaft 16 has an end 18 extended from commutator 17. A holder indicated generally at 19 grips shaft end 18 to hold armature core 11 in a generally horizontal position. Holder 19 is connected to indexing mechanism (not shown) used to sequentially turn or index armature core 11 during the winding operation. Holder 19 has a cylindrical shield 21 that is located over commutator 17. Shield 21 is part of a lead moving and guiding unit operable to move and guide each end wire lead that extends from the coil just wound on the armature and around a selected commutator hook while at the same time shielding the entire commutator except the selected hook. This prevents other and previously attached leads from leaving their hooks.

Wires 24 and 26 are wound into slots 13 and 14 of the body 12 with a pair of rotating flyers 22 and 23. Flyer 22 is rotatably mounted on a fixed support 27 of the armature winding machine. An endless belt 28 connects flyer 22 to a electric drive motor 29. Flyer 23 is rotatably mounted on another fixed support 31 of the armature winding machine. An endless belt 32 drivably connects flyer 23 with an electric motor 30. Flyers 22 and 23 are rotated in opposite directions during the winding operation. Other types of drive structures can be used to rotate flyers 22 and 23.

A pair of shroud assemblies 33 and 34 are located adjacent opposite sides of armature body 12. Shroud assembly 33 is mounted on a tubular support 36 to position shroud assembly 33 adjacent one side of armature body 12. Shroud assembly 34 is mounted on tubular support 37 to locate assembly 34 adjacent the opposite side of armature body 12. Supports 36 and 37 are longitudinally movable to move shroud assemblies 33 and 34 in opposite outward directions to allow armature core 11 after the wire is wound thereon to be removed from the machine and replaced with an unwound armature core.

Shroud assemblies 33 and 34 are duplicate structures mounted on supports 27 and 31 respectively. Shroud assemblies 33 and 34 are commonly known as tooling for guiding the wire in generally opposite slots of the armature core body 12 when the flyers are rotated. Shroud assemblies 33 and 34 are releasably locked onto supports 27 and 31 so that they can be readily removed as a unit and replaced with shroud assemblies to accommodate a different size and types of armature cores. The following description is directed to shroud assembly 34. The parts of shroud assembly 33 having the equivalent parts of shroud assembly 34 identified with the same reference numeral having the suffix A.

Figures 2, 4:
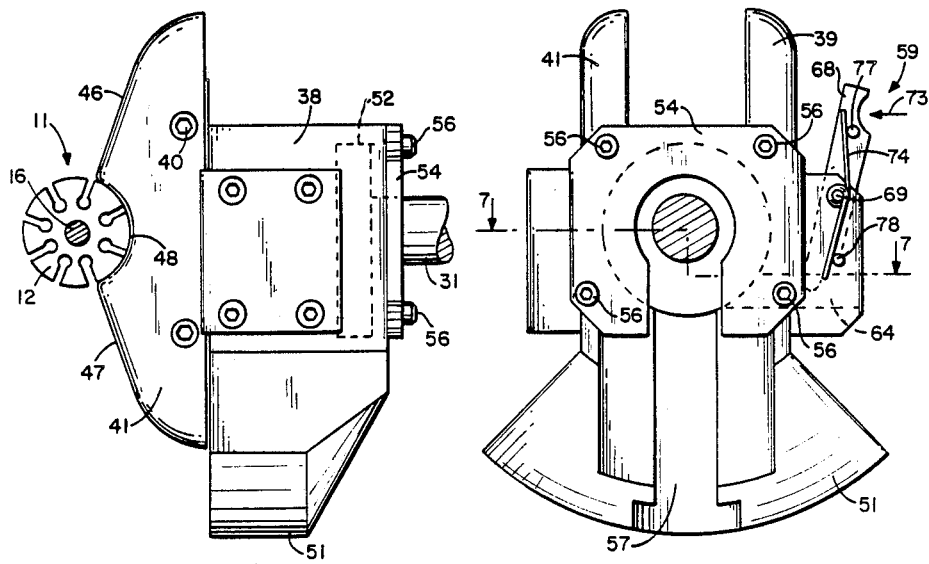
FIG. 2 is an enlarged sectional view taken along the line 2—2 of FIG. 1.
FIG. 4 is a sectional view taken along the line 4—4 of FIG. 3.
Figure 9:
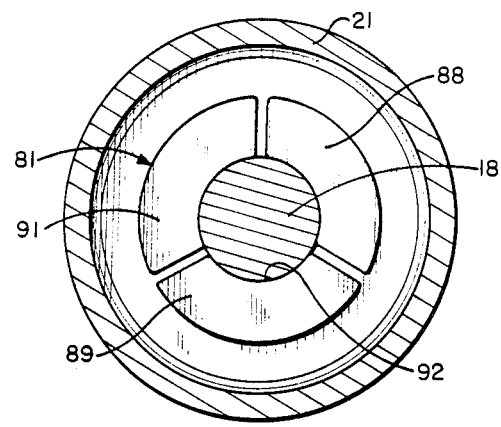
FIG. 9 is an enlarged sectional view taken along line 9'9 of FIG. 8.
Figure 10:
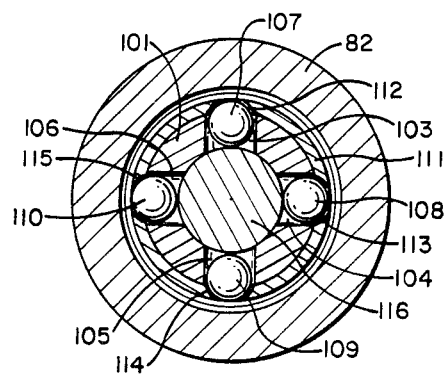
FIG. 10 is an enlarged sectional view taken along line 10—10 of FIG. 8.

Shroud assembly 34 has a body 38 supporting a pair of generally upright guide plates 39 and 41. Guide plates 39 and 41 are secured to opposite sides of body 38 with bolts 40. Guide plate 39 has a pair of inwardly converging curved faces 42 and 43 that lead to a central concave curved recess 44. Recess 44 accommodates a circumferential portion of the side of armature core body 12. As shown in FIG. 2, guide plate 41 has inwardly converging curved faces 46 and 47 joined to a central concave curved recess 48. As shown in FIG. 7, body 38 located between side plates 39 and 41 has a concave recess 49 aligned with the recesses 44 and 48. Returning to FIGS. 2, 3, and 4, guide plates 39 and 41 extend upwardly from the top of body 38. Body 38 extends in a downward direction below the guide plates 39 and 41 terminating in an enlarged lower section 51 providing a counter balance and weight that retains the shroud assembly in its generally upright position on the end of support 31.

Referring to FIG. 7, support 31 has a head 52 at its outer end. Head 52 is an annular outwardly directed circular flange which longitudinally locates shroud assembly 34 on support 31. Body 38 has an upright groove 53 having a width substantially the same as the diameter of head 52. Groove 53 is a recess groove which is partly closed with a plate 54 attached to the end of body 38 with a plurality of bolts 56. The lower end 57 of groove 53 is open to allow shroud assembly 34 to be lifted from support 31. The upper end 58 of groove 53 has as a semi-circular curved shape that conforms to the curvature of head 52. The head 52 and body 38 with groove 53 are cooperating structures that allows shroud assembly 34 to be located in its operative position and removed as a unit from head 52. The cooperating structure can have a head on the support that is accommodated in a groove in the shroud assembly.

A releasable lock assembly indicated generally at 59, shown in FIGS. 3, 4, 6 and 7, functions to retain shroud assembly 34 on support 31. Releasable lock assembly 59 has a body or member 61 secured to side of body 38 with a plurality of bolts 62. The lower portion of member 61 has a transverse hole or bore 63 accommodating a linear locking dog 64. The inner end 66 of dog 64 has an upwardly and outwardly taper that engages the lower portion of head 62, as shown in FIG. 6. This retains the head 52 in engagement with curved end 58 of slot 53. Dog 64 slidably positioned through a hole 67 in body 38 extends into groove 53. A lever 68 is pivotally mounted on a pivot pin 69 extended through holes in member 61. Opposite ends of pivot pin 69 extend through member 61 as shown in FIG. 3. The lower end of lever 68 has a downwardly directed finger 71 extended into a slot 72 in locking dog 64. Lever 68 when moved in the direction of arrow 73 pulls locking dog 64 to a released position as shown in broken lines in FIG.

6. Shroud assembly 34 can then be lifted as a unit from the head 52.

Locking dog 64 is biased by a pair of springs 74 and 76 to its in or lock position. Springs 74 and 76 have coiled bodies positioned about the opposite ends of pivot pin 69 as shown in FIG. 3. Springs 74 and 76 have upwardly directed legs that engage a transverse pin 77 secured to the upper end of lever 68. Springs 74 and 76 also have lower legs that extend downwardly and engage opposite ends of a fixed or anchor pin 78 secured to member 61. Springs 74 and 76 concurrently bias lever 68 in a direction to yieldably hold locking dog 64 in its in or locking position, as shown in FIG. 6, to retain shroud assembly 34 on support 34.

In use, shroud assembly 34 can be removed as a unit from the end support 31 by moving lever 68 toward body 38 to its released position. This moves locking dog 64 outwardly away from head 52. The entire shroud assembly 34 can then be lifted or raised in the direction of the arrow 79, as shown in FIG. 3, to separate it from support 31. Shroud assembly 33 can be removed in a similar manner from support 36 by moving releasable lock 59A to the release position. Shroud assemblies having shapes to accommodate different armature cores can then be mounted on supports 31 and 36. The exchange of the shroud assemblies 33 and 34 for different shaped shroud assemblies can be done in a relatively short period of time to accommodate different sizes and types of armature cores. Additional adjustments of the shroud assemblies are not required since they are complete assemblies compatible with selected sized armature cores. The shield 21 for the commutator of the core can be removed from support 82 and replaced with a shield compatible with the selected armature core. Shield 21 is axially adjustable on support 82 to permit adjustment for minor differences in commutator sizes.

Referring to FIG. 8, holder 19 has a collet assembly indicated generally at 81 for holding armature core 11. Collet assembly 81 is located within an elongated tubular support 82. The inner portion of collet assembly 81 is connected to an elongated rod 83. Rod 83 is connected to a linear actuator (not shown) operable to longitudinally move the rod 83 in opposite directions as indicated by arrow 84 to selectively open and close the collet assembly 81. Collet assembly 81 has a plurality of side members 85, 86, and 87 terminating in enlarged heads 88, 89, and 91. Preferably, three side members are located about a cylindrical pocket 92 for accommodating the end 18 of armature core shaft 16. Heads 88, 89, and 91 have tapered outer surfaces 93 and 94 that cooperate with complementary tapered surface 96 and support 82. Surface 96 has a generally cone shape. The tapered outer surfaces of heads 88, 89, and 91 slide on surface 96. When collet assembly 81 is moved into tubular support 82, heads 88, 89, and 91 move inwardly into clamping relation with the shaft end 18. When rod 83 is moved in a opposite or outward direction, heads 88, 89, and 91 move away from cone surface 96 and thereby release shaft end 18. Armature 11 can then be readily removed from collet assembly 81.

As shown in FIG. 8, when shaft end 18 is located in collet assembly 81, the entire commutator 17 is positioned within shield 21. One side of shield 21 has an opening 97 which exposes one hook of commutator 17 to accommodate a wire. Side member 87 has a longitudinal groove 98 accommodating the inner end of pin 99. Pin 99 is secured to tubular support 82. Pin 99 being located in groove 98 prevents the collet assembly 81 from rotating relative to support 82 and allows a relative linear movement of the collet assembly 81 within tubular support 82.

Collet assembly 81 has a cylindrical body 101 in engagement with collet side members 86 and 87. Body 101 has an elongated central longitudinal chamber 102 and a plurality of radial holes 103, 104, 105 and 106. Movable members, such as balls 107, 108, 109 and 110 are disposed within holes 103, 104, 105 and 106 respectively. An elongated sleeve 111 surrounding the inner end of body 101 is located over balls 107, 108, 109, and 110. Sleeve 111 has recesses 112, 113, 114, and 115 for accommodating the outer portions of balls 107, 108, 109, and 110 to lock body 101 onto sleeve 111. Balls 107, 108, 109, and 110 connect body 101 to sleeve 111 and prevent relative movement between body 101 and sleeve 111. Balls 107, 108, 109, and 110 are retained in their locking positions with a cylindrical locking member 116 slidably disposed in chamber 102. Locking member 116 has a cone shaped end 117 joined to a longitudinal rod 118. Rod 118 is slidably disposed within a longitudinal bore 119 in body 101. Bore 119 is open to the bottom of pocket 92. A coil compression spring 121 biases locking member 116 in general alignment with balls 107, 108, 109, and 110. The cylindrical portion of locking member 116 prevents balls 107, 108, 109, and 110 from moving out of recesses 112, 113, 114, and 115 in the sleeve 111. A plug 122 extended into chamber 102 holds spring 121 in assembled relation with body 101.

Figure 12:
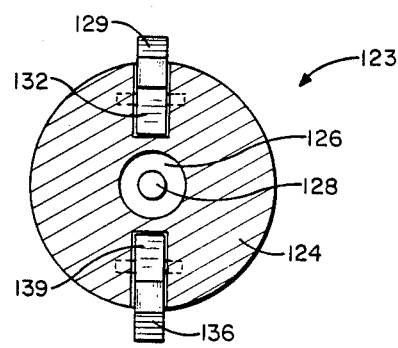
FIG. 12 is an enlarged sectional view taken along line 12—12 of FIG. 11.

Referring to FIGS. 11 and 12, there is shown the tool indicated generally at 123 used to insert and remove collet assembly 81 from tubular support 82. This enables the operator of the machine to replace collet assemblies to accommodate different sized armature cores. Tool 123 has an elongated cylindrical body 124 having a central longitudinal passage 126. A cylindrical slide 127 movably located in passage 126 extends through the outer end thereof. Slide 127 is attached to an elongated push rod 128 that extends through the opposite or forward end of body 124. A first finger 129 located within a slot 134 in the forward end of body 124 is pivoted thereon with a pivot pin 131. The forward end of first finger 129 has an inwardly directed hook 132 adapted to engage the collet head. A spring 133 located within body 124 biases finger 129 in an outward direction to hold hook 132 in clamping relation with a collet. Body 124 has a second finger 136 located diametrically opposite first finger 129. Second finger 136 located in a longitudinal slot 137 is pivoted on body 124 with a pivot pin 138. The forward end of second finger 136 has an inwardly directed hook 139 facing hook 132. A spring 141 located within body 124 biases second finger 136 to hold hook 139 in clamping relation with a collet. Hooks 132 and 139 are released from the collet by applying, squeezing or pressing force as indicated by the arrows 142 and 143 on fingers 129 and 136. Referring to FIG. 13, there is shown tool 123 in assembled relation with collet assembly 81 for removing the collet assembly from support 82. Fingers 129 and 136 extend into the space surrounded by commutator shield 21. Hooks 132 and 139 extend into grooves or slots 144 and 146 in the outer portions of collet heads 88 and 89. Springs 133 and 141 acting on fingers 129 and 136 maintain hooks 132 and 142 in slots 144 and 146. Push rod 128 extends into bore 119 and engages the end of rod 118. The operator pushes slide 127 in the direction of arrow 147 into body 124 to move locking member 116 to a release position. The coneshaped portion 117 of locking member 116 is located in alignment with the balls 107, 108, 109, and 110. This allows the balls 107, 108, 109, and 110 to move into the holes 103, 104, 105, and 106 and out of engagement with sleeve 111. Collet assembly 81 as a unit can then be withdrawn from tubular support 82 by longitudinally moving tool 123 away from the support.

A different collet assembly can be inserted into the tubular support 82 with tool 123. Fingers 129 and 136 are released from collet assembly 81 by compressing fingers 129 and 136 in the direction of arrows 142 and 143. This releases hooks 132 and 139 from slots 144 and 146. Push rod 128 is axially withdrawn from bore 119 in body 101. Fingers 129 and 136 are snapped into slots in the selected collet assembly. Slide 127 moves push rod 123 into the selected collet assembly to move locking member 116 to a position wherein balls 107, 108, 109, and 110 are in their release position. The collet assembly is then moved axially into tubular support 82. The collet assembly is circumferentially turned to align slot 98 with pin 99 so that the collet assembly can be moved to its in or locked position in support 82. Slide 127 is then released. Spring 121 moves locking member 116 to its locked position. This forces balls 107, 108, 109, and 110 in a radial outward direction and into locking position in recesses 112, 113, 114, and 115 located in sleeve 111. Spring 121 retains locking member 116 in its locked position. Fingers 129 and 136 are then released from the heads 88 and 89 of the collets by compressing fingers in the direction of arrows 142 and 143. Tool 123 is then withdrawn from the collet assembly.

An armature core is mounted on holder 19 by inserting shaft end 18 into pocket 92 surrounded by the collet members 86, 87 and 90. When rod 83 is pulled the collet members 86, 86 and 90 are forced into tight gripping engagement with shaft end 18. Commutator shield 21 can be axially moved on support 82 to adjust for minor differences in commutator shapes.

There has been shown and described an embodiment of an armature winding machine having a collet assembly and removable shrouds. Changes in the structures, arrangement of structures, materials and shapes of parts can be made by one skilled in the art without departing from the invention. The invention is defined in the following claims.

The embodiments of the invention in which an exclusive property or privilege is claimed are defined as follows:

1. In a machine having means for winding coils of wire onto a slotted armature core: core holding means for locating the armature core in a position to receive coils of wire from the means for winding coils of wire onto the armature core, shroud means for guiding wire into selected slots in the armature core, support means for holding the shroud means adjacent the armature core, and means for releasably mounting the shroud means on said support means whereby the shroud means can be removed as a unit from the support means, said means for releasably mounting the shroud means on the support means includes a head on the support means, said head having outwardly directed flange means, said shroud means having a groove for accommodating the head and flange means, and releasable lock means on the shroud means engageable with the head for holding the shroud means in the assembled relation with the support means, said lock means being releasable whereby the shroud means can be removed from the head.

2. The structure of claim 1 wherein: said outwardly directed annular flange means of said head is annular, said groove having an arcuate end accommodating the annular flange means, and said releasable lock means being engageable with the head for holding the arcuate end of the groove in engagement with the annular flange means.

3. The structure of claim 1 wherein: said releasable lock means includes a locking dog slidably mounted on the shroud means, said dog having an end engageable with said head to hold the collet assembly on the support means, and lever means for moving the dog to a released position whereby the shroud means can be removed from the head.

4. The structure of claim 3 including: biasing means engageable with the lever means to hold the dog in locking engagement with said head.

5. In a machine having means for winding coils of wire onto a slotted armature core, the combination of: core holding means for locating the armature core in a position to receive coils of wire from the means for winding coils of wire onto the armature core, shroud means for guiding wire into selected slots in the armature core, support means for holding the shroud means adjacent the armature core, and means for releasably mounting the shroud means on said support means whereby the shroud means can be removed as a unit from the support means, said means for releasably mounting the shroud means on the support means including cooperating means on the shroud means and support means, said cooperating means includes a head having an outwardly directed flange means and a groove for accommodating the head and flange means, and releasable lock means for holding the cooperating means in a locked position, said releasable lock means being engageable with said head to hold the shroud means in locking engagement with the support means, said lock means being movable to a released position wherein the shroud means can be removed from the support means.

6. The structure of claim 5 wherein: said outwardly directed annular flange means of said head is annular, and said groove having an arcuate end for accommodating the annular flange means, and said releasable lock means being engageable with said head to hold the arcuate end of the groove in engagement with the annular flange means.

7. The structure of claim 5 wherein: said releasable lock means includes a locking dog slidably mounted on the shroud means, said dog having an end engageable with said head to hold the shroud means on the support means, and lever means for moving the dog to a released position whereby the shroud means can be removed from the head.

8. The structure of claim 7 including: biasing means engageable with the lever means to hold the dog in a locking engagement with said head.

9. The structure of claim 5 wherein: said flange means is an outwardly directed flange means having at least one semi-circular outer peripheral edge, said groove means having a semi-circular upper end acccommodating the semi-circular outer peripheral edge of the flange, and said releasable lock means holding the semi-circular outer peripheral edge of the flange means in engagement with the semi-circular upper end of the groove means.

10. The structure of claim 9 wherein: said groove means has an open lower end and said upper end being closed whereby the head and flange means are moved into the groove means through the open end thereof.

11. The structure of claim 10 wherein: said groove means has channel side portions accommodating said flange means to hold the shroud means on the head.

12. In a machine having means for winding coils of wire onto a slotted armature core, core holding means for locating the armature core in a position to receive coils of wire from the means for winding coils of wire onto the armature core, shroud means for guiding wire into selected slots in the armature core, and means for holding the shroud means adjacent the armature core when the core is in a position to receive coils of wire from the means for winding coils of wire onto the armature core, including: means for releasably mounting the shroud means on said support means whereby the shroud means can be removed as a unit from the support means, said means for releasably mounting the shroud means on the support means includes cooperating means on the shroud means and support means, said cooperating means includes first means having outwardly directed flange means on one of said shroud means or support means, second means having groove means for accommodating the flange means on the other of said shroud means or support means, and releasable lock means cooperating with said first means to hold the shroud means in locking engagement with the support means, said lock means being movable to a release position wherein the shroud means can be removed from the support means.

13. The structure of claim 12 wherein: said flange means is an outwardly directed flange means having at least one semi-circular outer peripheral edge, said groove means having a semi-circular upper end accommodating the semi-circular outer peripheral edge of the flange, and said releasable lock means holding the semi-circular outer peripheral edge of the flange means in engagement with the semi-circular upper end of the groove means.

14. The structure of claim 12 wherein: said groove means has an open lower end and said upper end being closed whereby the first means and flange means are moved into the groove means through the open end thereof.

15. The structure of claim 12 wherein: the first means includes a head having said outwardly directed flange means, said head being attached to the support means, and said groove means comprising a linear groove in said shroud means.

16. The structure of claim 15 wherein: said groove has channel side portions accommodating said flange means to hold the shroud means on the head.

17. In a machine having means for winding coils of wire onto a slotted armature core, core holding means for locating the armature core in a position to receive coils of wire from the means for winding coils of wire onto the armature core, shroud means for guiding wire into selected slots in the armature core, and means for holding the shroud means adjacent the armature core when the core is in a position to receive coils of wire from the means for winding coils of wire onto the armature core, including: means for releasably mounting the shroud means on said support means whereby the shroud means can be removed as a unit from the support means, said means for releasably mounting the shroud means on the support means including first means on one of said shroud means or support means for fixing the position of the shroud means on the support, second means having groove means for accommodating the first means on the other of said shroud means or support means, said first means including a head having flange means, said groove means comprising linear groove means for accommodating said flange means, and releasable lock means cooperating with said first means to hold the shroud means in locking engagement with the support means, said lock means being movable to a release position wherein the shroud means can be removed from the support means.

18. The structure of claim 17 wherein: said flange means is an outwardly directed flange means having at least one semi-circular outer peripheral edge, said groove means having a semi-circular upper end accommodating the semi-circular outer peripheral edge of the flange, and said releasable lock means holding the semi-circular outer peripheral edge of the flange means in engagement with the semi-circular upper end of the groove means.

19. The structure of claim 17 wherein: said groove means has an open lower end and said upper end being closed whereby the first means and the flange means are moved into the groove means through the open end thereof.

20. The structure of claim 17 wherein: said groove means has channel side portions accommodating said flange means to hold the shroud means on the head.

21. The structure of claim 17 wherein: said releasable lock means includes at least one locking dog slidably mounted on the means, said dog having an end engageable with the first means to hold the shroud means on the support means, and lever means for moving the dog to a release position away from the first means whereby the shroud means can be removed from the first means.

22. The structure of claim 21 including: biasing means engageable with the lever means to hold the dog in locking engagement with said first means.

* * * * *